Sept. 11, 1945.                L. F. CARTER                    2,384,452
                           TRIM ANGLE INDICATOR
                            Filed Oct. 24, 1942
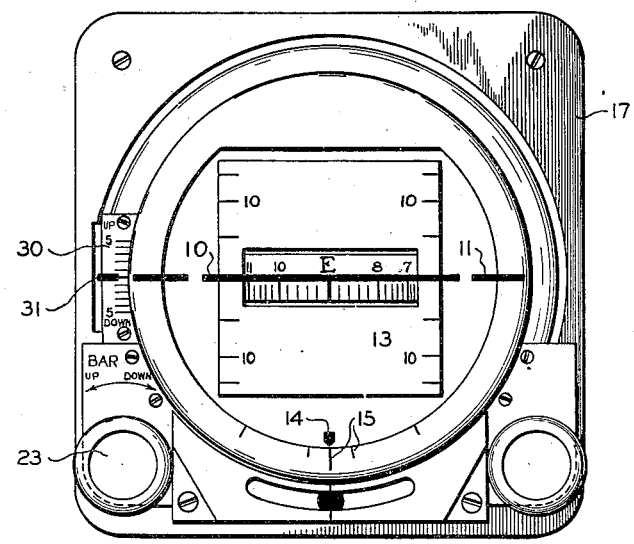
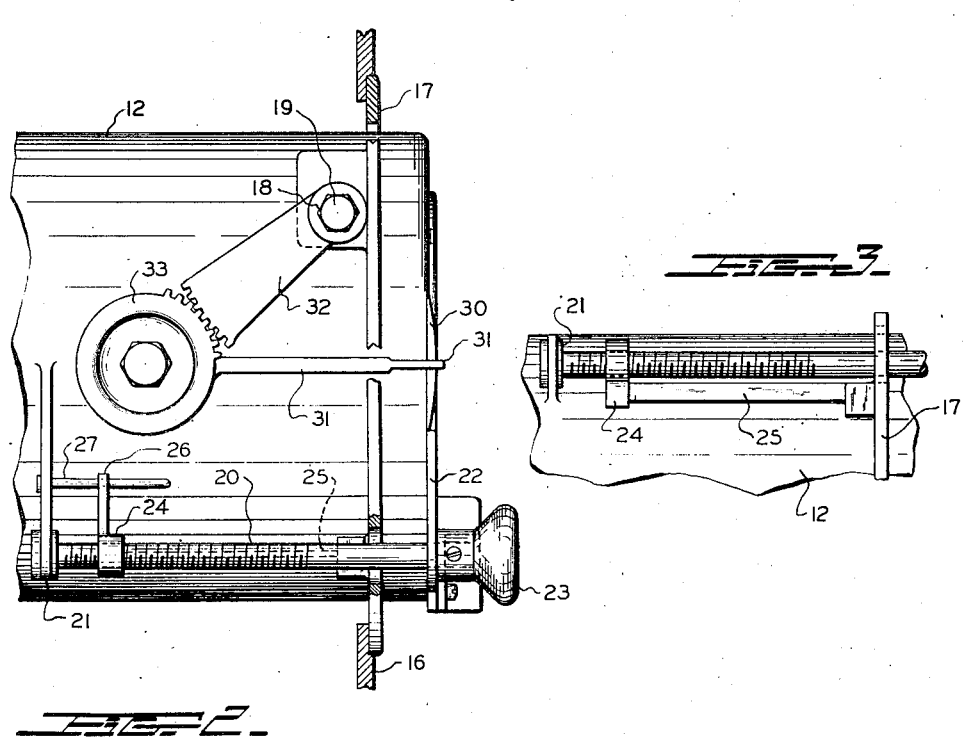
INVENTOR,
LESLIE F. CARTER,
BY *H H Thompson*
HIS ATTORNEY.

Patented Sept. 11, 1945

2,384,452

UNITED STATES PATENT OFFICE 2,384,452

TRIM ANGLE INDICATOR

Leslie F. Carter, Leonia, N. J., assignor to Sperry Gyroscope Company, Inc., Brooklyn, N. Y., a corporation of New York Application October 24, 1942, Serial No. 463,289

4 Claims. (Cl. 33—204)

This invention relates generally to artificial horizon indicating instruments.

One of the features of the invention resides in utilization of a trim scale indicator by which the degree of angular adjustment required, between the casing of an instrument of this character and the panel on which it is pivotally mounted, to obtain a true indication from the horizon instrument may be observed.

A further feature of the invention is provided in the novel mechanism employed to adjust the position of the casing about its axis with relation to the instrument board panel of the dirigible craft on which the artificial horizon indicating instrument is mounted.

Other features and structural details of the invention will be apparent from the following description when read in relation to the accompanying drawing wherein Fig. 1 is a front elevation view of an artificial horizon instrument constructed in accordance with the present invention.

Fig. 2 is a side elevation view of the instrument shown in Fig. 1, and

Fig. 3 is a detail bottom plan view of the mechanism for adjusting the position of the casing of the instrument with relation to the fixedly mounted instrument board panel.

With reference to the drawing, a conventional type of artificial horizon instrument is employed to illustrate the present inventive concepts. The face of the instrument shown provides an artificial horizon indication by means of the relatively movable indexes 10 and 11. Index 10 is an arm which may be positioned by means of a gyro vertical of suitable construction that is contained within an enclosing casing 12. Spaced indexes 11 are fixed to the casing 12 and, as well understood in the art, cooperate with the relatively movable index 10 to give an indication of level flight when the parts thereof are situated in an aligned relation as shown in Fig. 1. Tilt of the dirigible craft on which the instrument is mounted about the horizontal or pitch axis thereof away from a level flight condition is indicated by departure of the indexes from aligned relation. With tilt about the pitch axes of the craft, the indexes remain in parallel relation and the index 10 appears to move either upwardly or downwardly with relation to the indexes 11. If in apparently level flight according to the horizon instrument, the craft is actually either gaining or losing altitude as indicated by an altimeter instrument, it is necessary to trim the horizon instrument to overcome this condition and obtain a correct or true indication therefrom. Such conditions necessarily arise because of unbalanced loading of the craft or a change in loading of the craft as it proceeds in flight. The present invention is primarily useful in indicating the degree of trim correction required of the artificial horizon instrument when the craft is in true level flight.

The specific instrument shown in Fig. 1 is a horizon compass, the stabilized compass card thereof being indicated at 13. The instrument also indicates tilt about the bank axes of the craft by means of the hereinbefore mentioned indexes 10 and 11 and also the relatively movable index 14 and cooperating indexes 15. The internal construction of the instrument which may include a horizon index positioning and compass stabilizing gyro vertical is of conventional form and is consequently not shown in detail.

In accordance with the teaching of the present invention, the outside casing 12 of the artificial horizon indicating instrument is pivotally mounted on the instrument board panel of the dirigible craft. As shown in Fig. 2, the instrument board of the craft is indicated at 16 and the panel 17 of the instrument is fixedly mounted thereon in a suitable manner. Two trunnions 18, one of which is shown in Fig. 2, extend from opposite sides of the casing 12 and journal in two similar bearings 19 which are fixed to the rear of the instrument panel 17. Panel 17 has a central opening through which the front or face of the horizon instrument extends. Bearings 19 and trunnions 18 support the casing 12 for pivotal movement about an athwartship axis with reference to the craft so that by positioning the casing 12 with reference to the panel 17, a true indication may be obtained from the gyro controlled horizon instrument.

With particular reference to Figs. 2 and 3, a novel means is provided for adjusting the angular position of the casing 12 and panel 17 in the form of a mechanism which includes an axially rotatable screw threaded rod 20, one end of which is rotatably mounted in a boss 21 situated on the side of the casing 12. The rod 20 extends through an opening in the panel 17 and the other end is rotatably positioned by a knob 23 with the aid of a plate 22 which is situated in fixed relation to the front face of the casing 12. Knob 23 is secured to the end of rod 20 and provides a suitable means for turning the same. Rod 20 is mounted for rotation by knob 23 but holds its position between two fixed points on the casing 12 while rotating, namely boss 21 and plate 22. The mechanism further includes a threaded lug 24 which is fixedly spaced from the interior wall of panel 17 by a flat connecting member in the form of a relatively stiff spacing spring 25, Fig. 3. Lug 24 is secured against turning with the rod 20 by means of an extending fixed arm 26 which includes an opening in which a pin 27 is secured. Pin 27 extends parallel to the axis of the rod 20 and is fixedly mounted on the boss 21. When the rod 20 is turned by means of knob 23, the lug 24 retains its position and the boss 21 is moved either away from or towards the lug 24 as spring 25 flexes to accommodate the motion, depending on the direction of rotation of the rod. This turns the casing 12 about its pivotal mounting defined by trunnion 18 and bearings 19 and consequently effects the relative positioning of the horizon indexes 10 and 11 previously described in the manner desired.

This novel structural design for the lower bearing of the casing provides a simple but flexible positioning mechanism at the bottom of the casing while making possible the use of an ordinary pivotal bearing for the top bearing of the instrument. This type of structure avoids the necessity for providing a complicated spring-held pivotal bearing at the top of the instrument casing which would be required in the absence of the novel construction disclosed by applicant. Limited but accurate motion of the instrument relative to the panelboard from which it is suspended is the main object of the applicant's construction as herein disclosed.

The trim scale indicator provided in accordance with the teaching of the invention is shown to include a trim scale plate 30 which preferably is mounted in a fixed position on the casing 12. A pointer arm or index 31 movable relative to the scale 30 is controlled by the described means for varying the angular position of the casing 12 with relation to the panel 17. Arm 31 is moved proportionally to the angular movement of the casing with respect to panel 17 accomplished by turning knob 23 by means of a mechanism consisting of fixed sector gear 32 which extends radially from the pivotal axis of the casing 12 and is mounted on one of the bearings 19. Arm 31 extends through an opening in the panel 17 to a pivotally mounted sector gear 33 to which it is fixed. The sector gear 33 and consequently arm 31 move about the axis of the gear which is provided by a suitable bearing on a fixed trunnion extending from the side of the casing 12. The axis of arm 31 and the axis about which the casing moves are situated in spaced parallel relation. It will be understood that when the casing 12 is moved by the adjusting mechanism through means of knob 23, the pivot axis of the sector gear 33 moves relatively to the fixed sector 32 and sector gear 33 and arm 31 move correspondingly to change the position of the pointer part of the arm with relation to scale 30. Scale 30 is graduated in degrees in the present instance so that the trim setting of the instrument in the craft may be observed by the pilot.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

What is claimed is:

1. Means for indicating the trim angle of a gyro controlled artificial horizon instrument for dirigible craft comprising the combination of a gyro controlled artificial horizon instrument having a casing adapted to be pivotally mounted about an athwartship axis on the instrument board panel of the dirigible craft, a trim angle indicator having a scale extending vertically along the front of said casing, mechanism for varying the angular position of the casing with reference to the panel to compensate for departure in a vertical plane of the fore and aft axis of the craft from the normal position required for constant altitude flight, and means cooperative with said vertical scale and responsive to the change in said angular position of said casing for denoting the direction and extent of said vertical departure.

2. An artificial horizon instrument with an outside casing pivotally mountable on the instrument panelboard of a dirigible craft and having a trim angle scale situated on the front of the casing, a pointer arm for said scale including a gear sector pivotally mounted on said casing for movement of the pointer arm about an axis parallel to the pivotal axis of the casing, means for turning said casing about its axis to vary its angular displacement relative to said panelboard, and a second gear sector fixed to the panelboard concentric with the pivotal axis of the casing and meshing with said first gear sector to position said pointer arm about its axis and thereby to reflect the angular movement of said casing upon said trim angle scale.

3. An artificial horizon instrument for dirigible craft having an instrument panelboard, comprising a casing mounted on said panelboard for rotation about an axis athwart said craft, said panelboard having an opening therein, mechanism for angularly positioning said casing about said axis with reference to said panelboard, and a trim angle indicator at the front of said casing comprising an arm pivotally mounted on said casing on an axis parallel to the pivot axis of the casing, said arm extending through the opening in said panelboard, means engaging said arm to position the same about its axis in response to movement of said casing positioning mechanism, cooperative scale and index means supported by said arm and said casing respectively to denote the angularity of said casing.

4. Means for indicating the trim angle of an artificial horizon instrument for a dirigible craft comprising an artificial horizon instrument having a casing pivotally mountable on the instrument panelboard of said craft, a trim angle scale fixed to the front of said casing, mechanism to rotate said casing about its pivotal axis for changing its position relative to said panelboard, a pointer arm for said scale mounted on said casing for pivotal movement about an axis parallel to the pivotal axis of the casing, and a two part engaging mechanism for positioning said arm, one part of which engaging mechanism is fixed to the arm and the other part of which is fixed to the instrument panelboard.

LESLIE F. CARTER.